Figure 1:
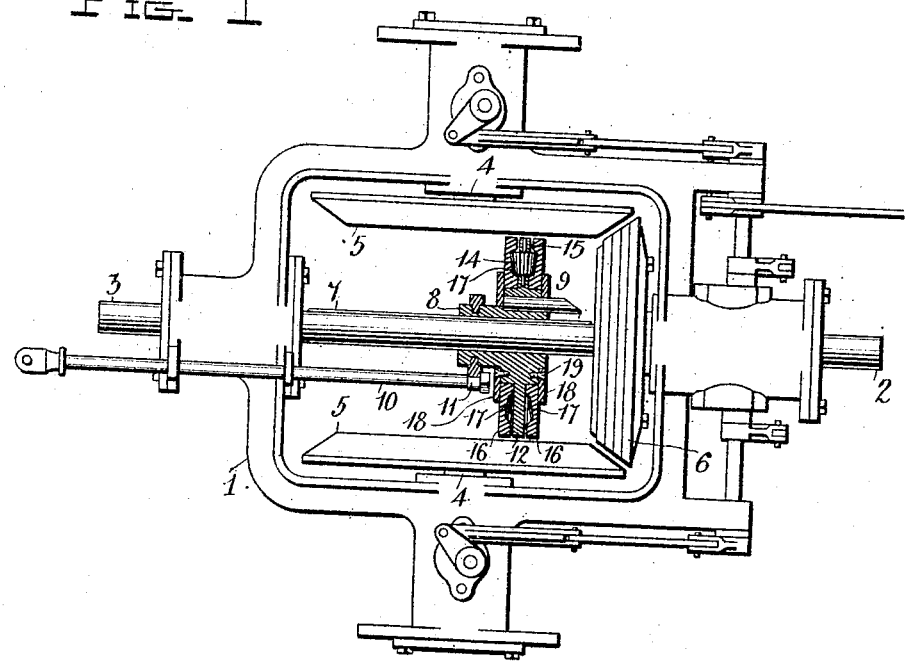

E. H. MANNING.
FRICTIONAL POWER TRANSMISSION DEVICE.
APPLICATION FILED OCT. 18, 1907.

903,744.

Patented Nov. 10, 1908.

Witnesses
J. L. Jenkins
Wm. Bagger

Inventor
Ebenezer H. Manning
By Victor J. Evans
Attorney

UNITED STATES PATENT OFFICE.

EBENEZER H. MANNING, OF ELKHART, INDIANA. BEST AVAILABLE COPY

FRICTIONAL POWER-TRANSMISSION DEVICE.

No. 903,744.

Specification of Letters Patent.

Patented Nov. 10, 1908.

Application filed October 18, 1907. Serial No. 398,111.

*To all whom it may concern:*

Be it known that I, EBENEZER H. MANNING, a citizen of the United States, residing at Elkhart, in the county of Elkhart and State of Indiana, have invented new and useful Improvements in Frictional Power-Transmission Devices, of which the following is a specification.

This invention relates to frictional power transmission devices which are used for the transmission of power from a motor driven shaft to another shaft which is directly connected with the parts to be driven; the principal objects of the invention being to retain perfect control of the mechanism when driven at varying speeds.

The invention has particular reference to that class of power transmission devices in which a friction disk carried by the motor driven shaft is in peripheral contact with two oppositely disposed driven disks which are in parallel relation with each other; said driven disks serving to transmit motion to an intermediately disposed friction wheel which is longitudinally movable upon the driven shaft; said friction disk being adjustable diametrically across the faces of the oppositely disposed parallel disks for the purpose of controlling the speed as well as the direction of rotation; the speed being governed by the distance of the driven disk from the axes of the oppositely disposed friction disks, while the direction of rotation is reversed by transferring the driven disk from one side of said axes to the other side thereof; and it being further understood that when the diameter of the driven disk coincides with the axes of the oppositely disposed driving disks it will remain stationary and will, in point of fact, operate as a brake.

In devices of the class described, it has been found that power has been lost owing to frictional resistance between the rim or periphery of the driven disk and the faces of the oppositely disposed driving disks; this is explained on the hypothesis that different points of the faces of the driving disks at different distances from the axes of said disks, or, in other words, different points in the same radius, move at different speeds according to the distance of such points from the central point or axis; while the different points in the periphery of the driven disk simultaneously contacting with the face of a driving disk move at equal speed; hence, a very objectionable friction will be developed between the contacting portions of the faces of the driving disks and the rim of the driven disk; and this friction will be increased with every increase in the width of the driven disk. And inasmuch as, in order to secure transmission, the said driven disk is usually made with a contact face an inch or more in width, and the contacting surfaces being moreover of such a nature as to induce and promote frictional contact, it is obvious that the loss of power from this cause becomes an item of considerable importance.

The principal object of the present invention is to overcome the objections just referred to; further objects being to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention: it being, however, understood that no limitation is necessarily made to the precise structural details therein exhibited, but that changes, alterations and modifications within the scope of the invention may be resorted to when desired.

Figure 2:
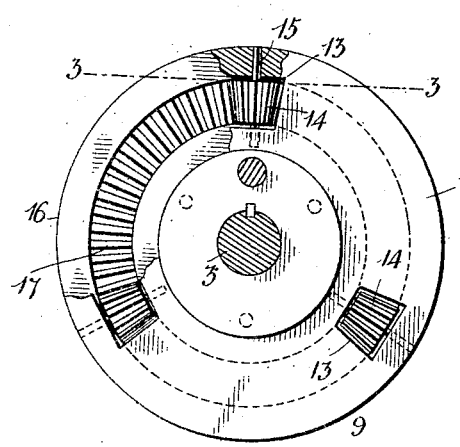
Figure 3:
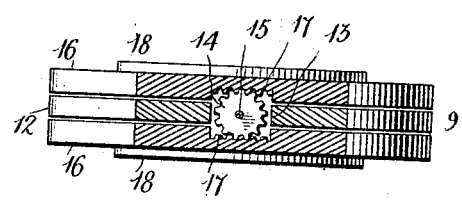

In the drawing, Figure 1 is a diagrammatic plan view, partly in section, of a power transmission device constructed in accordance with the invention. Fig. 2 is a side elevation, partly in section, of the friction equalizing disk. Fig. 3 is a sectional detail view taken on the line 3—3 in Fig. 2.

Corresponding parts in the several figures are denoted by like characters of reference.

The frame 1 of the improved transmission device is provided with suitable bearings for the motor driven shaft 2 and the transmission shaft 3 which are disposed in axial alinement with each other. The frame 1 is also provided with bearings for shafts 4, disposed at right angles to the shafts 2 and 3, and carrying friction wheels or disks 5 having beveled rims or peripheries which are adapted for frictional contact with a correspondingly beveled friction wheel 6 carried by the motor driven shaft 2. Means are provided whereby relative adjustment of the friction wheels or disks 5 and 6 may be effected for the purpose of regulating the degree of frictional contact between said disks; but the mechanism whereby this adjustment is effected is not regarded as part of the present invention, and does not require to be herein described or illustrated in detail.

Slidably mounted upon the transmission shaft 3, and connected therewith for rotation by means of a feather or spline 7 is a hub 8 carrying the friction equalizing disk 9, the periphery of which is in frictional contact or engagement with the faces of the oppositely disposed friction disks 5—5. The hub 8 is adjustable upon the shaft 3 by means of a suitably operated sliding rod 10 carrying a ring 11 that engages an annular groove in the hub 8. The equalizing disk 9 is in the nature of a compensating gearing, and it comprises a central or intermediate disk or flange 12 extending from and connected with the hub 8; said flange being provided with a plurality of equidistant apertures 13 wherein bevel pinions 14 are supported for rotation upon pins or shafts 15 which are radial to the axis of the hub 8. The latter supports, adjacent to the flange 12, a pair of rings 16 provided upon their inner faces with circular racks 17 meshing with the pinions 14, and constituting in conjunction therewith a compensating gear, as previously stated. The rings 16 are retained in engagement with the pinions carried by the flange 12 by means of annular connecting members 18 which are secured by means of fastening members such as screws 19 upon the ends of the hub, thus assembling and connecting the several parts without preventing or interfering with the free and independent movement of said parts. The flange 12 and the rings 16 are in peripheral engagement with the oppositely disposed friction disks 5, the faces of which are unobstructed so that the friction equalizing wheel may be moved diametrically across said faces in contact therewith.

It will be readily seen from the foregoing that the friction equalizing wheel has a peripheral contact face comprising a plurality of independent contact points formed by the peripheries of the flange 12 and the rings 16. These members while operatively connected with each other, are capable of free and independent movement, and the speed of each will adjust itself to the speed of the portion of the face of the friction disk 5 with which it is in actual contact, and which varies according to its distance from the axis of the disk. The different portions of the rim of the friction equalizing wheel will thus adjust themselves with regard to speed, and much objectionable friction will thus be avoided.

Having thus fully described the invention, what is claimed as new is:—

In a frictional power transmitting device, the combination of a driving shaft carrying a friction disk, a pair of oppositely disposed rotary transmission disks for coöperation therewith, a transmission shaft supported in longitudinal alinement with the driving shaft, a sliding sleeve on said transmission shaft, and a frictional transmission wheel comprising a main disk provided with a hub extending beyond opposite sides thereof and integral with said sleeve, supplementary disks mounted upon the hub on opposite sides of said main disk, differential gearing connecting the disks, annular retaining rings having smooth surfaced openings receiving the ends of the sleeve, said rings being arranged to bear against the outer ends of the hub and outer faces of the supplementary disks to retain the latter in operative relation to the main disk, and fastenings passing transversely through said rings into the ends of the hub.

In testimony whereof I affix my signature in presence of two witnesses.

EBENEZER H. MANNING.

Witnesses:
Wm. Bagger,
John L. Fletcher.